UNITED STATES PATENT OFFICE 2,471,472

METHOD OF FORMING PHOSPHONIC AND THIOPHOSPHONIC ACID CHLORIDES

Willard H. Woodstock, Flossmoor, Ill., assignor to Victor Chemical Works, a corporation of Illinois No Drawing. Application April 28, 1945,
Serial No. 590,956

6 Claims. (Cl. 260—543)

This invention relates to a method of forming phosphorus compounds and the resulting products, and more particularly to the formation of alkenyl phosphorus oxydichlorides and sulfodichlorides from addition products of olefins and phosphorus pentachloride.

Unsymmetrical olefins, having a terminal double bond, react with $PCl_5$ to form phosphorus addition products, and these addition products may then be reacted with phosphorus pentasulfide or phosphorus pentoxide.

Type A olefins which have two alkyl groups or an aryl group attached to the 2-carbon generally react with phosphorus pentachloride to add —Cl to the 2-carbon and —$PCl_4$ to the 1-carbon. Type B olefins which have only one alkyl group on the 2-carbon atom generally react with phosphorus pentachloride to add —$PCl_4$ to the 2-carbon atom and —Cl to the 1-carbon atom.

To form the oxydichlorides and sulfodichlorides of this invention the organic —$PCl_4$ products are reacted with $P_2O_5$ or $P_2S_5$, as shown in equations A and B below.

(A)
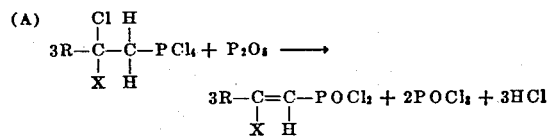

(B)
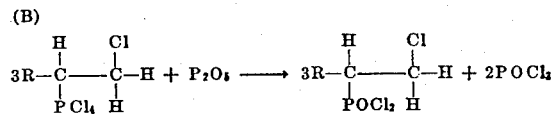

$P_2S_5$ may be substituted for $P_2O_5$ in the above equations.

Reaction products of the type A equation have lost HCl and are alkenyl 1-phosphorus oxy- and sulfodichlorides, while reaction products of the type B equation retain a chlorine atom on the 1-carbon and are chloroalkyl 2-phosphorus oxy- and sulfodichlorides.

The products of either reaction may be separated by distillation and the organic phosphorus oxychloride may then be reacted with alcohols or phenols to produce esters, with organic or inorganic bases to form salts, with ammonia and amines to produce amides, and with water to produce phosphonic acids.

Esters derived from esterifying reactions with the products of Equation A are unsaturated alkenyl-1-phosphonic acid esters, while those derived from the products of Equation B are chloroalkyl esters of saturated organic phosphonic acids. Such chloroalkyl esters and alkenyl-1-phosphonic esters above methyl are new compounds, as are the phosphorus oxydichloride compounds themselves.

In Formula A R represents an alkyl or aryl group, and X represents hydrogen or alkyl or aryl group.

In Formula B R is a normal alkyl group.

Suitable olefins for the (A) reaction include styrene, alpha methyl styrene, alpha chlorostyrene, indene, isobutylene, 2.2.diphenyl ethylene, di-isobutylene, and the isoalkylenes where two carbon atoms are attached to the number 2 carbon. Such isoalkylenes include isoamylenes, isoheptenes, iso-octenes, etc.

Starting hydrocarbons of the (B) type include propylene, butene-1, pentene-1, octene-1, etc.

The following are examples of the process and products:

Example 1

In a 5 l. three-necked flask equipped with stirrer, thermometer, and water-bath were placed 2 liters of dry benzene and 685 grams (10% excess) styrene. After cooling to below 30° C., 1250 grams of phosphorus pentachloride was added over a period of 1.5 hours. The thick slurry of addition product was stirred for an additional period of 30 minutes or longer to insure completion of the reaction.

Without separating the above addition compound from the benzene reaction medium, 300 grams phosphoric anhydride was added over a period of one hour. The temperature was raised to 60° C. and held for several hours to permit escape of the hydrogen chloride formed in the reaction. At this point the charge was clear with only a small amount of sediment present which may be filtered off. The charge was then heated sufficiently to remove the last traces of dissolved hydrogen chloride and distil off the benzene solvent and by-product phosphorus oxychloride. Finally the styryl-1-phosphorus oxydichloride product was distilled in vacuo at 180–190° C. (20 mm. pressure). The product weighed 1060 grams which represented a yield of approximately 81%. The product was a crystalline white to slightly yellow solid. It had a boiling point of 182–184° C. (18 mm. pressure) and a melting point of 70° C. The structural formula may be written

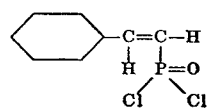

Example 2

213 grams of commercial di-isobutylene containing about 80% of the 2,4,4-trimethyl pentene-1 isomer was reacted with 250 grams of phosphorus pentachloride in 600 cc. dry benzene while stirring and cooling at less than 10° C. to form the iso-octenyl-2-chloro-1-phosphorus tetrachloride addition compound. This addition compound without separation from the benzene medium was held at below 10° C., and 57 grams phosphoric anhydride added slowly. The temperature was then gradually raised over a 45 minute period to 30° C., after which it was raised to about 50° C. and the liquid stirred for an hour while completing the evolution of the HCl formed by the reaction. The liquid was separated from a small amount of solid residue, and phosphorus oxychloride and benzene solvent removed by distillation at reduced pressure. The residual liquid product was then fractionally distilled. The fraction between 135–143° C. (20 mm. pressure) was recovered and purified by redistillation to give 205 grams of a colorless liquid product, which represented a yield of approximately 75%. The iso-octenyl-1-phosphorus oxydichloride thus produced had a boiling point of 128–9° C. at 13 mm. pressure, and a specific gravity of 1.129 at 25° C. It had a melting or solidifying point of below −70° C.

The reaction involved in this example is substantially as follows:

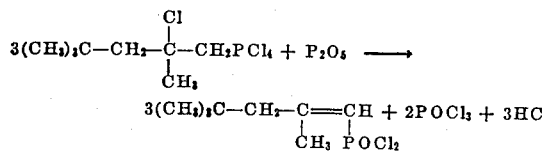

Example 3

208 grams (1 mole) of phosphorus pentachloride was suspended in 850 cc. anhydrous benzene in a 2 liter flask, equipped with a stirrer and cooling bath. The mixture was cooled to within a few degrees of the freezing point of benzene, and 60 grams (1.1 mole) isobutylene was bubbled in at a rate slow enough to keep the temperature at about 12° C. while the flask was immersed in an ice-salt bath. This required about 30 minutes.

To the above prepared isobutylene-phosphorus pentachloride addition product was slowly added 50 grams (0.35 mole) phosphoric anhydride. The mixture was then heated on a water bath to about 60° C. while stirring. After about 3 hours substantially all of the phosphoric anhydride had reacted. The solution was then filtered and the filtrate evaporated until its boiling point reached 80° C. at 30 to 40 mm. pressure to remove the liberated hydrogen chloride and benzene solvent. The residual liquid was then vacuum distilled. The fraction coming over at 103–107° C. (22 mm. pressure) was collected and purified by redistillation. The product was a colorless liquid having a boiling point of 99–101° C. (17 mm. pressure) and a specific gravity of 1.302. Its solidifying point was below −70° C. It was identified by analyses as the isobutylene-1-phosphorus oxydichloride $((CH_3)_2C=CHPOCl_2)$. The yield was approximately 80% of theoretical.

Other alkenyl-1-phosphorus oxydichloride compounds may be similarly prepared by selecting hydrocarbon-phosphorus pentachloride addition compounds of the 2-chloro-1-phosphorus tetrachloride type as starting materials.

Example 4

The diethyl ester of isobutenyl-1-phosphonic acid was prepared by reacting isobutenyl-1-phosphorus oxydichloride with anhydrous ethanol.

In a 1-liter flask, 334 grams (2 g. moles) of isobutenyl-1-phosphorus oxydichloride from Example 3 was slowly added to 368 grams (4 g. moles) of anhydrous ethanol while maintaining the temperature at not over 20° C. The mixture was held in vacuo at 20° C. for 1 hour, and 2 hours at 30° C. to remove the liberated hydrogen chloride. The temperature was then raised to about 75° C. to distil off the excess alcohol. The liquid product was then distilled; the boiling point being 107° C. at 5 mm. pressure. The diethyl isobutenyl-1-phosphonate thus produced is a water-white, clear, mobile liquid which is soluble in water. It has a specific gravity of 1.038, and a refractive index of 1.441 ($N_D$). This ester has the unique property of being only slightly more viscous at −70° C. than at room temperature, and, therefore, should be valuable as a cooling medium in refrigeration and as a hydraulic fluid.

The reaction involved in the formation of the ester may be expressed by the equation:

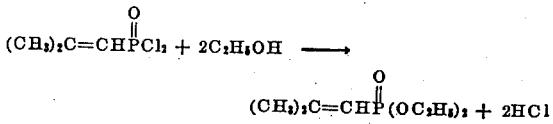

Example 5

The dioctyl styryl-1-phosphonate ester was prepared by adding one gram mole of styryl-1-phosphorus oxydichloride (from Example 1) to an excess of anhydrous 2-ethylhexanol (octyl alcohol) at a temperature below 30° C. The mixture was then placed under vacuum and held 1 hour at 30° C., 1 hour at 50° C., and 1 hour at 75° C. The excess alcohol and last traces of hydrogen chloride were removed at a higher temperature. The dioctyl ester was then distilled over a temperature of 235–240° C. (4 mm. pressure) and re-distilled for purification. The purified ester was a clear almost colorless liquid having a specific gravity of 0.973, a boiling point of 238–240° C. (3 mm. pressure) and formed a glassy solid at −79° C. This product is an excellent plasticizing agent for vinyl and cellulose ester type resins because of its extremely low volatility and ability to impart low temperature flexibility to the plasticized resins.

Example 6

The diphenyl ester of styryl-1-phosphonic acid was prepared by reacting styryl-1-phosphorus oxydichloride with sodium phenolate. 20 grams of styryl-1-phosphorus oxydichloride from Example 1 was dissolved in 50 grams of phenol at 40–60° C. and slowly added to 25 grams sodium phenolate in 150 grams phenol and the mixture stirred. After the reaction was complete the mixture was poured into a solution of 135 grams NaOH in 1200 cc. water. The ester product precipitated out as a granular material weighing 26 grams, which represented a yield of 85%. On recrystallization from methanol the pure diphenyl-1-styryl phosphonate ester product had a true melting point of 109° C.

Esters prepared from the products of Reaction A—that is, alkenyl-1-phosphorus type, when containing 4 or more carbon atoms in the alkenyl group and 4 or more carbon atoms in the ester group are excellent plasticizing agents because of their low evaporation rates, low water solubility, high boiling points, and low rates of hydrolysis.

The following is an example of the use of $P_2S_5$ in place of $P_2O_5$ in the formation of alkenyl-1-phosphorus compounds:

*Example 7*

Styryl-1-phosphorus sulfodichloride may be prepared by reacting the styrene-phosphorus pentachloride addition compound with phosphorus pentasulfide.

To 3 gram moles of styrene-phosphorus pentachloride addition compound, suspended in benzene, was added 1 gram mole of phosphorus pentasulfide and the mixture heated to about 60° C. for 5 hours while hydrogen chloride was being evolved. After substantially all of the pentasulfide had dissolved the solution was filtered. The filtrate was heated under vacuum to distil off solvent, the hydrogen chloride, and the by-product inorganic phosphorus sufochloride, then further heated to distil the styryl-1-phosphorus sulfodichloride product which boiled at 162–165° C. (8 mm. pressure). The product had a specific gravity of 1.345 at 26° C., and a melting point of about —20° C. Analysis of the product showed it to correspond substantially to the theoretical values for the formula

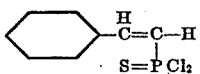

Other unsaturated organic phosphorus sulfodichlorides may be prepared by similarly reacting phosphorus pentasulfide with other hydrocarbon-2 chloro-1-phosphorus tetrachloride addition compounds.

As in the case of the oxydichloride products, the sulfodichloride products can also be reacted with alcohols and phenols to produce esters, with ammonia and amines to produce amides, and with water to produce thiophosphonic acids.

*Example 8*

The diphenyl ester of styryl-1-thiophosphonic acid was prepared in substantially the same manner as the diphenyl ester of styryl-1-phosphonic acid, by reacting 20 grams styryl-1-phosphorus sulfodichloride with 30 g. sodium phenolate in 200 g. of phenol. On pouring the reacted mixture into a solution of 135 grams NaOH in 1200 cc. water, a theoretical yield of a crude crystalline product melting at 75–79° C. was obtained. On recrystallizing from 160 cc. of methanol a pure crystalline diphenyl styryl-1-thiophosphonate ester was obtained which had a melting point of 83° C.

The following examples illustrate reactions involving the hydrocarbon-phosphorus pentachloride addition compounds in which the —PCl₄ radical is attached to the 2 carbon, and which lead to the saturated chloroalkyl type compounds on reaction with phosphoric anhydride, and phosphorus pentasulfide in accordance with the following general equations:

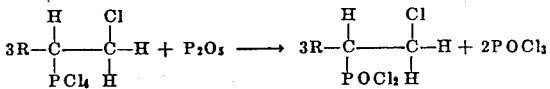
and
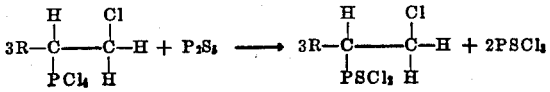

*Example 9*

In a 2-liter 3-necked flask, 125 g. butene-1 (2 g. moles+10% excess) was dissolved in 1200 cc. dry benzene and cooled with an ice bath. 417 grams phosphorus pentachloride was added at 0° to 5° C. and the charge stirred for 6 hours at this temperature to complete the addition reaction. Without removing the addition compound from the benzene medium, 106 grams phosphoric anhydride was added and the slurry agitated at room temperature for 5 hours, at 35° C. for 4 hours, and at 50° C. for 9 hours. After filtering the solution was heated under vacuum to evaporate off the benzene solvent. On further heating phosphorus oxychloride was distilled off and the product which distilled over from 116–123° C. at 18 mm. pressure was recovered. It was a water-white liquid and weighed 224 grams which represented a yield of 53.5%. It analyzed 15.4% P, 49.5% Cl and corresponded substantially to the 1-chlorobutyl-2-phosphorus oxydichloride of the formula

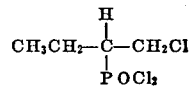

*Example 10*

In a 2-liter 3-necked flask, 81.5 grams pentene-1 (1 gram mole at 95% purity plus 10% excess) was dissolved in 1200 cc. dry benzene and cooled to below 10° C. with an ice bath. 208.5 grams (1 gram mole) phosphorus pentachloride was slowly added while stirring. A white, thickened slurry of addition compound formed which was allowed to warm up to room temperature.

To the addition compound prepared in the above manner, 55 grams phosphoric anhydride was added. The charge was stirred 2 hours at room temperature, 3 hours at 35° C., and 3 hours at 50° C. The excess phosphoric anhydride was filtered off, and the solution heated under vacuum to remove the phosphorus oxychloride and benzene solvent. On further heating a crude distillate was collected between 115° and 138° C. at 18 mm. pressure. On redistillation the purified product obtained was a colorless liquid which solidified on cooling. The 1-chloroamyl-2-phosphorus oxydichloride product obtained has a melting point of 39–42° C., a boiling point of 130–132° C. (20 mm. pressure), and a specific gravity of 1.319 at 25° C. Analysis of the product corresponds to the formula

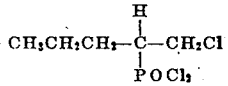

*Example 11*

1-chloropropyl-2-phosphorus oxydichloride was prepared as follows: 208.5 grams phosphorus pentachloride was suspended in 1200 cc. dry benzene and 160 grams gaseous propylene bubbled into the mixture over a period of 11 hours while stirring and maintaining the temperature at about 20° C.

To the propylene-phosphorus pentachloride addition compound prepared in the above manner was added 55 grams of phosphoric anhydride, and the charge stirred 3 hours at room temperature, 3 hours at 35° C., and 4 hours at 50° C. The charge became clear, and after filtering it was distilled at atmospheric pressure. The benzene solvent distilled over between 40 and 90° C. Phosphorus oxychloride came over between 92 and 116° C. The third fraction distilling over between 125 and 218° C. was redistilled, substantially all of the product being collected between 190 and 218° C. at atmospheric pressure. The product was a clear liquid analyzing 16.6% P, 53.0% Cl, and represents substantially the 1-chloro-propyl-2-phosphorus oxydichloride indicated by the formula

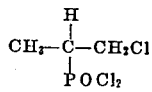

The 1-chloroalkyl-2-phosphorus oxydichloride compounds prepared as in the above examples may be reacted with alcohols and phenols to produce esters, with amines to produce amides, and with water to produce chloroalkyl phosphonic acids.

The following example illustrates the method of making the alkyl esters of the 1-chloro-alkyl-2-phosphonic acids.

*Example 12*

The dibutyl ester of 1-chloroamyl-2-phosphonic acid was prepared by reacting the 1-chloroamyl-2-phosphorus oxydichloride of Example 10 with an excess of butanol under anhydrous conditions. 150 grams of the chloroamyl phosphorus oxydichloride was mixed with 200 grams of anhydrous butanol and stirred for 25 minutes while maintaining the temperature at about 25-30° C. The mixture was then heated at about 55° C. for 6 hours while completing the evolution of the HCl. The excess butanol was evaporated off and the residual liquid distilled at about 160° C. at 20 mm. pressure. It was redistilled at 4 mm. pressure and the fraction boiling between 154° and 162° C. collected as the desired product. The dibutyl 1-chloroamyl-2-phosphonate ester thus obtained is a colorless liquid having a specific gravity of 1.106 at 25° C. and a melting or solidifying point of below —70° C. Analysis of the product corresponds substantially to the formula

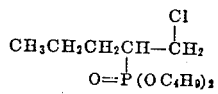

Chloroalkyl phosphonic acids may be prepared by reacting the chloroalkyl phosphorus oxydichlorides with water in accord with the following type reaction:

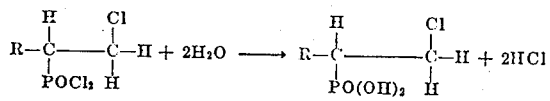

The reaction conditions shown in the above examples may be varied without departing from the principles of the invention. For example, instead of a benzene reaction and solvent medium, other inert solvents such as toluene, carbon tetrachloride, phosphorus oxychloride, the chlorinated hydrocarbons, etc. may be used. Also, it is possible to carry out the reactions without the use of solvents by proper selection of mechanical mixing devices and reaction vessels. Also, the temperatures employed may be varied according to the nature of the reactants, but should at all stages be held below the decomposition point of the reactants and products. Lower temperature limits are not critical.

Where the starting material is originally prepared by reaction of unsaturated hydrocarbons and phosphorus pentachloride, an excess of the unsaturated hydrocarbon is not detrimental; in fact, it may serve as a solvent and reaction medium for the subsequent reactions.

The oxy- and sulfodichloride compounds produced in accordance with the above procedure are valuable intermediates for the production of new phosphonic acids, esters, amides, salts, etc.

The alkenyl phosphonate esters produced are valuable as plasticizers, oil additives, textile treating agents, etc.

The chloroalkyl phosphonate esters may be used as oil treating agents, flameproofing agents for textiles, as fire retarding plasticizers, etc.

The foregoing detailed description has been given for clearness of understanding only, and no unnecessary limitations should be understood therefrom.

What I claim as new, and desire to secure by Letters Patent, is:

1. The method which comprises reacting an addition product of PCl₅ and a mono-olefin of the formula

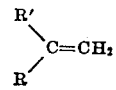

wherein R and R' are a pair of radicals selected from pairs of radicals consisting of: alkyl and alkyl, alkyl and aryl, aryl and aryl, aryl and hydrogen, and aryl and chlorine, with an acid anhydride of the class consisting of P₂O₅ and P₂S₅, in an inert solvent medium, heating the reaction mixture to drive off hydrogen chloride formed, and separating the solvent and by-product phosphorus chloride compounds from the unsaturated phosphorus compound.

2. The method as set forth in claim 1, in which the olefin is styrene.

3. The method of claim 1 wherein the acid anhydride is P₂O₅.

4. The method as set forth in claim 1, in which the acid anhydride is P₂S₅.

5. The method as set forth in claim 1, in which the olefin is isobutylene.

6. The method as set forth in claim 1, in which the olefine is di-isobutylene.

WILLARD H. WOODSTOCK.

REFERENCES CITED

The following references are of record in the file of this patent:

UNITED STATES PATENTS

| Number | Name | Date |
| --- | --- | --- |
| 2,279,501 | Dickey | Apr. 14, 1942 |
| 2,279,502 | Dickey | Apr. 14, 1942 |
| 2,286,792 | Dickey | June 16, 1942 |
| 2,286,794 | Dickey | June 16, 1942 |
| 2,365,466 | Hamilton | Dec. 19, 1944 |
| 2,389,576 | Kosolapoff | Nov. 20, 1945 |

OTHER REFERENCES

Bergmann: "Berichte Deut. Chem. Gesell.," vol. 63B, pp. 1158-1173 (1930); ibid., vol. 64B, pp. 1455-1480 (1931); ibid., vol. 66, pages 286-291 (1933).